United States Patent [19]
Egan et al.

[11] Patent Number: 5,253,911
[45] Date of Patent: Oct. 19, 1993

[54] GRIPPER APPARATUS FOR USE IN A ROBOTICS SYSTEM

[75] Inventors: Brian P. Egan, Longmont; Lynn C. Jacobs, Louisville, both of Colo.

[73] Assignee: Storage Technology Corporation, Louisville, Colo.

[21] Appl. No.: 863,440

[22] Filed: Apr. 3, 1992

[51] Int. Cl.⁵ .............................................. B25J 15/02
[52] U.S. Cl. ...................................... 294/116; 901/32; 901/38
[58] Field of Search ................ 294/116; 414/739, 932; 901/32, 36, 38, 39; 198/803.9

[56] References Cited

U.S. PATENT DOCUMENTS

| | | | |
|---|---|---|---|
| 4,473,147 | 9/1984 | Bouwman | 294/116 X |
| 4,488,637 | 12/1984 | Loeffler | 294/116 X |
| 5,054,836 | 10/1991 | Schulz | 294/116 |

FOREIGN PATENT DOCUMENTS

| | | | |
|---|---|---|---|
| 837855 | 6/1981 | U.S.S.R. | 294/116 |
| 965655 | 10/1982 | U.S.S.R. | 901/36 |
| 1186465 | 10/1985 | U.S.S.R. | |

Primary Examiner—David M. Mitchell
Assistant Examiner—Dean J. Kramer
Attorney, Agent, or Firm—Duft, Graziano & Forest

[57] ABSTRACT

Robot gripper jaw apparatus is disclosed that is suited for grasping a media cartridge in a robot-controlled media library, or for grasping other objects. The gripper jaw apparatus employs a novel circular cam which reduces the amount of torque required to operate the gripper jaws. This allows use of a relatively small servo motor. The use of a circular cam additionally decreases the overall size and complexity of the gripper apparatus as compared to conventional gripper mechanisms. The gripper apparatus provides for an easily controllable robot gripper jaw mechanism for grasping a media cartridge wherein the force applied by the gripper jaw mechanism does not damage the media cartridge being grasped, due to the use of a flat spring which limits the force applied to the media cartridge. In addition, the gripper apparatus does not require that the gripper drive servo motor be reversed in order to release the media cartridge. Therefore, the gripper jaw servo motor need only rotate in one direction. This uni-directional servo motor motion reduces the complexity of the gripper controlling electronics and also reduces servo motor brush wear.

22 Claims, 5 Drawing Sheets

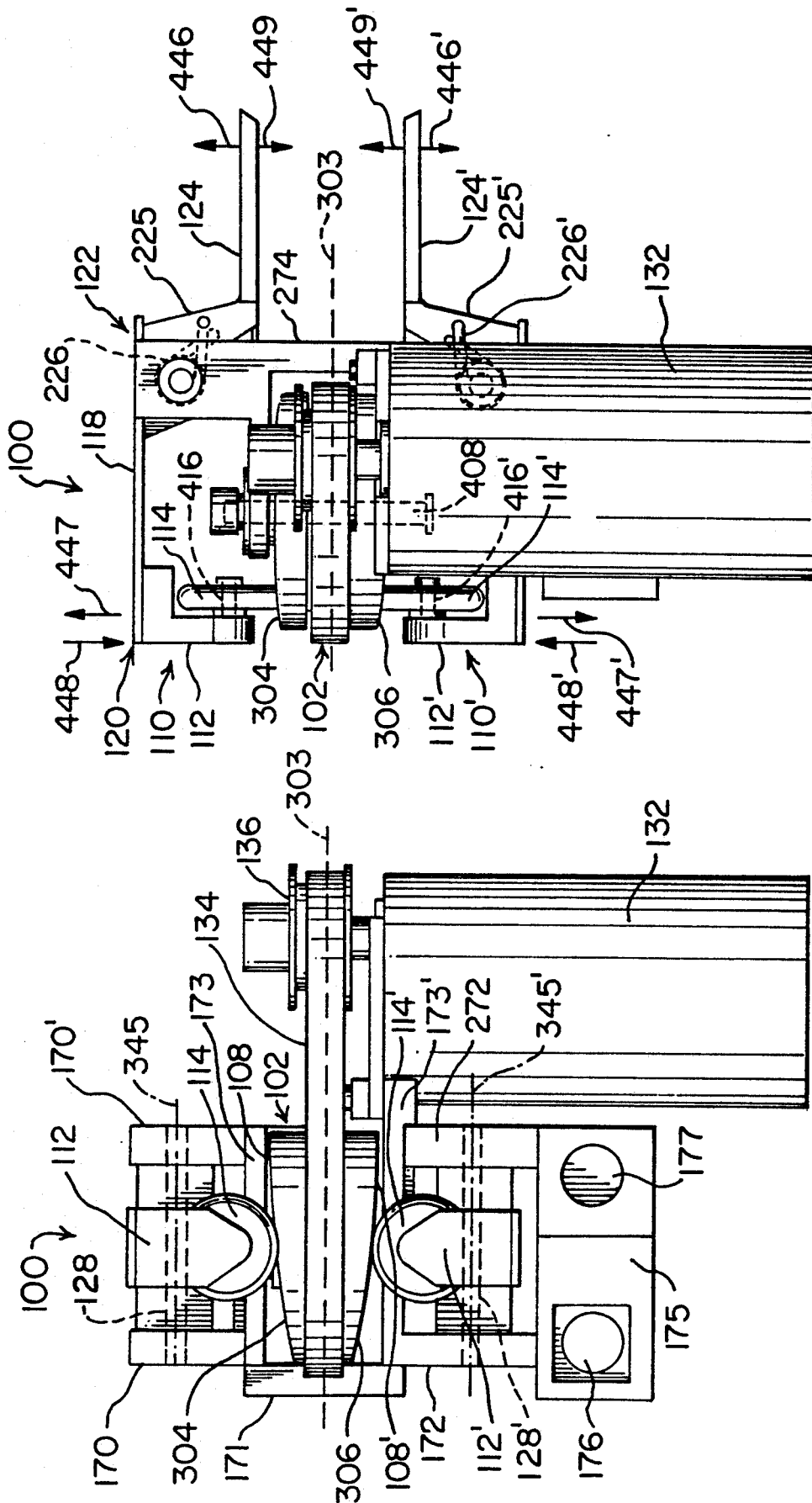

GRIPPER APPARATUS FOR USE IN A ROBOTICS SYSTEM

FIELD OF THE INVENTION

This invention relates generally to grasping devices used in robotics systems, and in particular, to gripper apparatus for grasping a media cartridge in a robot-controlled media library of a data processing system.

PROBLEM

It is a problem in robotics systems to grasp fragile objects such as magnetic tape media cartridges and the like without damaging them. A typical magnetic tape storage media cartridge used in data processing systems is an IBM 3480 form factor magnetic tape cartridge. This type of media cartridge typically has a plastic housing which is easily broken if excessive pressure is applied to it, as for example, when the housing is grasped by robotic jaws or grippers. A typical 3480 form factor media cartridge housing is relatively compliant, or flexible. Because of this compliance (flexibility) of the cartridge housing, the media inside the cartridge is subject to being damaged when excessive pressure is applied to the cartridge housing, even though the housing itself may not be damaged. In an automated robot-controlled media library, media cartridges are continually moved back and forth between tape cartridge storage cells and tape drive read/write heads. It is therefore desirable to provide a mechanism for grasping these media cartridges while preventing damage to either the cartridge housing or the media contained therein.

Furthermore, it is desirable to minimize the overall size of the robot gripper mechanism which is used to grasp a media cartridge. Both the gripper drive motor and the gripper jaw mechanism used in conventional gripper mechanisms are relatively bulky. In addition, conventional gripper mechanisms typically must reverse the drive motor direction in order to release a grasped object. Such reversal of the drive motor direction often causes jamming of the gripper mechanism.

SOLUTION

The above-described problems are solved and a technical advance achieved in the field by the gripper apparatus of the present invention. This gripper apparatus provides for an easily controllable gripper jaw mechanism for grasping a media cartridge, or other object, wherein the force applied by the gripper jaws does not damage the object being grasped.

As with prior art gripper mechanisms, the gripper apparatus of the present invention is driven by a servo motor. Unlike the prior art, however, the present gripper apparatus does not require that the gripper drive motor be reversed in order to release ("ungrasp") a media cartridge. Therefore, the gripper drive motor need rotate only in one direction. This uni-directional servo motor motion essentially eliminates the jamming of the gripper mechanism associated with prior art grippers. Uni-directional servo motor motion also reduces the complexity of the gripper controlling electronics and, in addition, reduces servo motor brush wear.

Furthermore, the present gripper apparatus employs a novel circular cam which reduces the amount of torque required to operate the gripper jaws. This allows the use of a smaller gripper drive motor. The use of a circular cam additionally decreases the overall size and complexity of the gripper apparatus, as compared to conventional gripper mechanisms which typically utilize either a combination of intermeshed worm and wheel gears or a long threaded rod to operate the gripper jaws.

BRIEF DESCRIPTION OF THE DRAWING

FIG. 3 is a front view of the gripper apparatus;

FIG. 4 is a side view of the gripper apparatus;

DETAILED DESCRIPTION OF THE INVENTION

Figure 2:
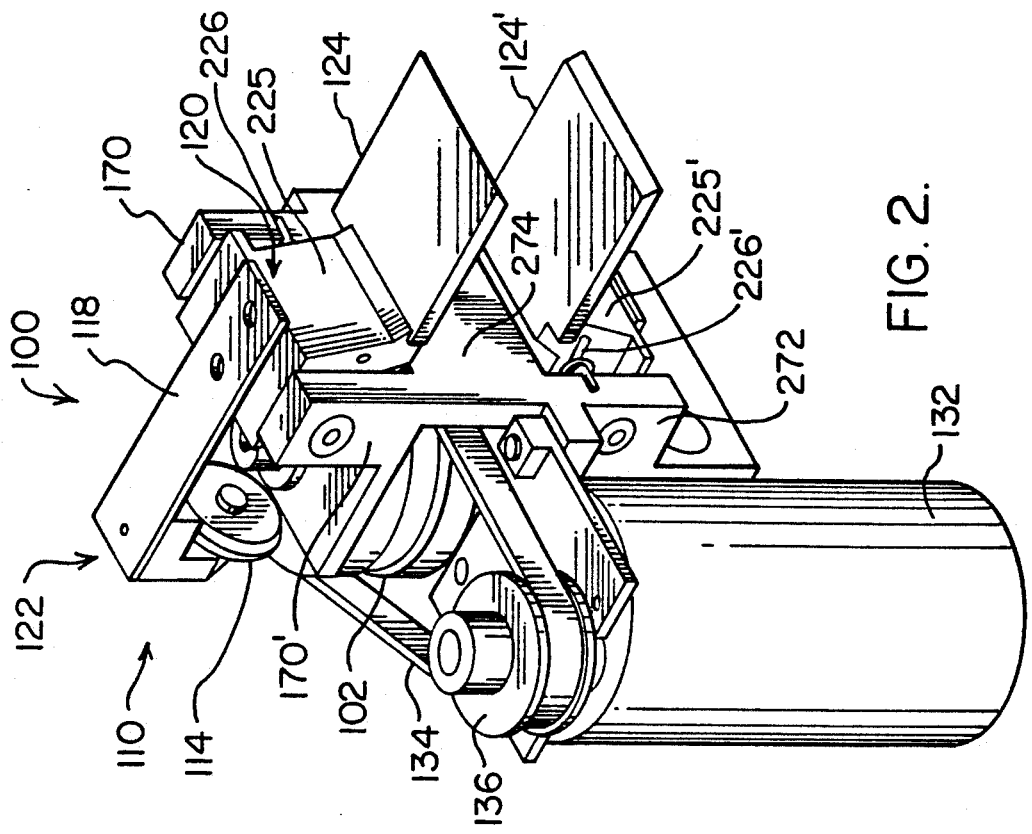
FIG. 2 is a second perspective view of the gripper apparatus.
Figure 1:
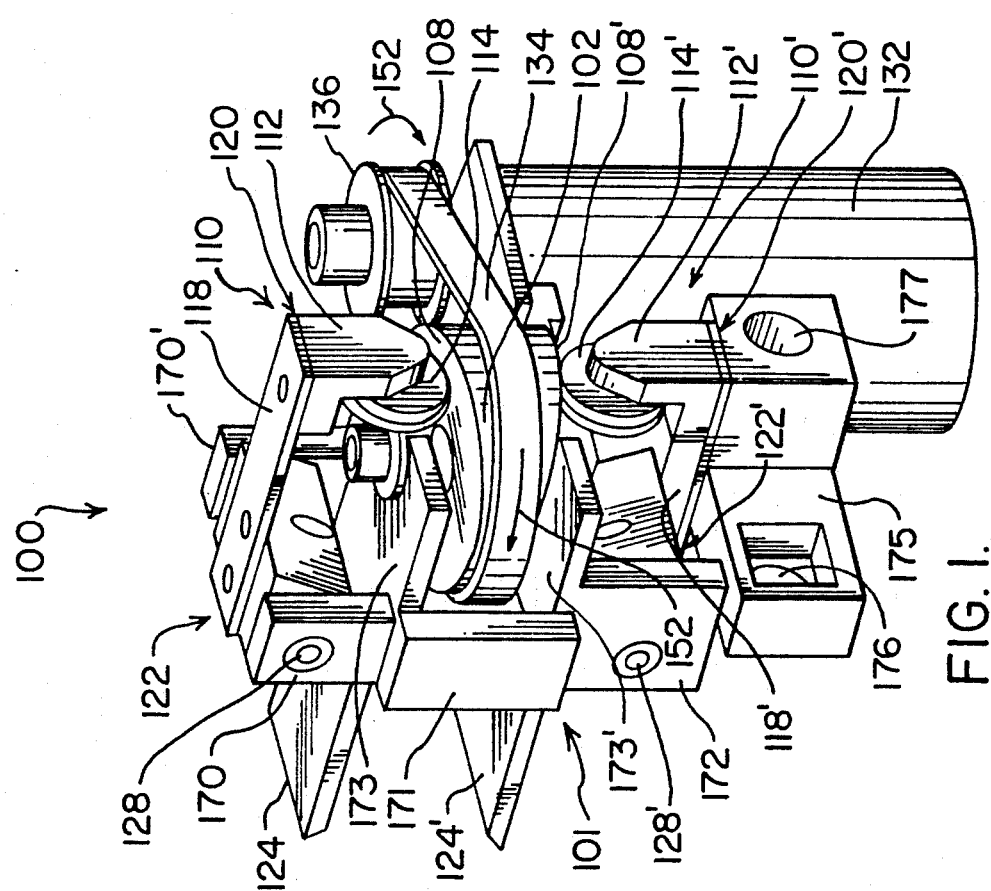
FIG. 1 is a first perspective view of the gripper apparatus comprising one possible exemplary embodiment of the apparatus.

Description of FIGS. 1 and 2

FIG. 1 illustrates a first perspective view of gripper apparatus 100 for grasping a media cartridge in an automated media library (not shown). FIG. 2 illustrates a second perspective view of the gripper apparatus 100.

As shown in FIG. 1, gripper apparatus 100 comprises a support frame 101 having a lobed circular cam 102 rotatably connected thereto. Cam 102 has lobes 108,108' disposed on its top and bottom surfaces. Cam 102 is rotated by drive belt 134 which is connected to drive pulley 136 of servo motor 132. Servo motor 132 may be controlled by any means well-known in the art. A pair of gripper jaws 124,124' is pivotally mounted on support frame 101, with each gripper jaw 124,124' being connected to a cam follower 110,110' via a flat spring 118,118'. Each cam follower 110,110' is comprised of flat spring 118,118', an attached vertical arm 112,112' and wheel 114,114'.

Flat springs 118,118' are sufficiently compliant so as to limit the pressure applied to a media cartridge grasped by jaws 124,124'. When cam 102 is rotated in direction 152 to a position such that cam follower wheels 114,114' are in contact with a high point (lobe 108,108') on cam 102, each cam follower 110,110' is displaced away from the other so as to cause gripper jaws 124,124' to close and grasp the media cartridge.

When cam 102 is rotated further in the same direction 152 to a position such that cam follower wheels 114,114' are in contact with a low (non-lobed) area of cam 102, each cam follower 110,110' is displaced toward the other. This causes gripper jaws 124,124' to open and release the media cartridge. Each gripper jaw 124,124' is biased toward an open position, by a torsion spring 226,226' to facilitate the releasing of a grasped media cartridge. This biasing of each of the gripper jaws 124,124' to an open position also causes the corresponding cam follower wheel 114,114' to maintain contact with the surface of the cam 102.

As shown in FIGS. 1 and 2, gripper apparatus 100 is comprised of support frame 101 which includes vertical members 170,170',171,172,272, and 274, and horizontal members 173 and 173'. Neither the shape nor the construction of the support frame 101 is critical to the operation of the present invention, and thus the support frame 101 could also be constructed from any number of alternative arrangements of members.

Cam follower wheel 114 contacts the top surface of the cam 102, and cam follower wheel 114' contacts the bottom surface of cam 102. Each cam follower 110,110' is comprised of a flexible horizontal spring member 118,118' and a vertical arm 112,112' attached to front end 120,120' of the horizontal member 118,118'. In the presently described embodiment, flexible horizontal member 118,118' is a flat spring. The back end 122,122' of flat spring 118,118' is attached to gripper jaw shoulder 225,225'. One end of the vertical arm 112,112' is connected to the front end 120,120' of the flat spring 118,118'. The other end of the vertical arm 112,112' has a bearing/wheel 114,114' rotatably connected thereto, via an axle. The bearing/wheel 114,114', for purposes of this document, is hereby defined as any rotatable or slidable means attached to either the cam follower vertical arm 112,112', or the front end 120,120' of the flat spring 118,118', which allows the front end 120,120' of the flat spring 118,118' and the cam follower arm 112,112' to freely slide across the surface of the cam 102. In the present embodiment of the invention, the bearing/wheel 114,114' is a wheel having a crowned surface on the circumference thereof, but the bearing/wheel 114,114' could optionally be a spherical bearing, or the like.

Each of gripper jaws 124,124' is pivotally connected to support frame 101 with top gripper jaw 124 being connected to vertical members 170,170' via horizontal pivot rod 128. Bottom gripper jaw 124' is connected to vertical members 172,272 via horizontal pivot rod 128'.

Gripper apparatus 100 moves toward and away from the media cartridge or other object to be gripped by sliding along circular guide rails (not shown) which pass through guide holes 176 and 177. Guide holes 176,177 are located in gripper apparatus guide member 175 which is attached to support frame vertical members 172 and 272. Apparatus is well-known in the art for moving the gripper apparatus 100 along guide rails toward and away from the object to be grasped. The details of such apparatus comprise no part of the invention.

Description of FIGS. 3 and 4

FIGS. 3 and 4 illustrate front and side views, respectively, of the gripper apparatus 100. Each gripper jaw 124,124' is biased, via torsion spring 226,226' toward an open direction 446,446' so as to facilitate releasing of a grasped media cartridge when gripper jaws 124,124' are opened. The force imparted by each torsion spring 226,226' (via gripper jaw shoulder 225,225') in direction 446,446' against the corresponding flat spring 118,118' also maintains the corresponding cam follower bearing/wheel 110,110' against a surface 304,306 of cam 102. Torsion spring 226 causes the upper cam follower bearing/wheel 114 to be biased against the top surface 304 of cam 102 in the direction shown by arrow 448. Torsion spring 226' causes the lower cam follower bearing/wheel 114' to be biased in a direction 448' against the bottom surface 306 of cam 102. Note that cam follower bearing/wheels 114,114' are connected to cam follower arms 112,112' via axles 416,416'. Each gripper jaw 124,124' is pivotally engaged, via pivot rod 128,128' to support frame 101 about a horizontal axis 345,345' oriented parallel to cam rotational plane 303.

Cam 102 is rotatably mounted between support frame horizontal members 173 and 173' via axle 408. Cam 102 is comprised of a circular disk having lobes 108,108' disposed on the top and bottom surfaces 304 and 306, respectively, thereof. Cam lobes 108,108' are described in detail below. When cam 102 is rotated about axle 408 so that the respective cam follower bearing/wheel 114,114' is positioned on one of lobes 108,108', the front end 120,120' of each flat spring 118,118' is displaced outwardly with respect to the cam rotational plane 303 in the direction shown by arrows 447,447'. The corresponding gripper jaw 124,124' is thus urged to a closed position in direction 449,449' via the connected flat spring 118,118'. Conversely, when cam 102 is rotated so that the corresponding cam follower bearing/wheel 114,114' is positioned on a non-lobed (flat) area of cam 102, the connected gripper jaw 124,124' is urged to an open position, in direction 446,446'.

Torsion Spring

Figure 5:
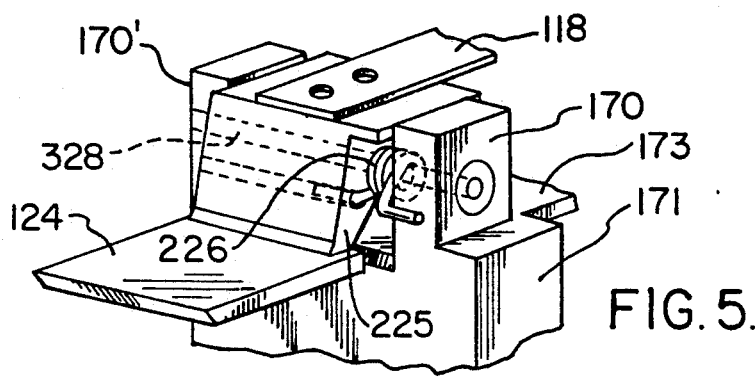
FIG. 5 is a perspective view showing a detail of a torsion spring connected to a gripper jaw.

FIG. 5 is a perspective view of the gripper apparatus 100 showing a detail of torsion spring 226 connected to gripper jaw 124. An identical torsion spring 226' is connected in like manner to gripper jaw 124', as shown in FIG. 2. Various types of springs other than the type depicted could also be used, provided that the spring causes the connected gripper jaw 124, 124' to be biased toward an open position. Each torsion spring 226,226' is located coaxially around pivot rod 128,128' about which the connected gripper jaw 124,124' is pivotally attached to support frame. A suitable torsion spring 226,226' would have a mean diameter of approximately 0.25 inches and a torque at a 10 degree deflection of approximately 0.9 inch pounds. The torsion spring 226,226' used in the present embodiment is made from three coils of 0.054 inch diameter spring steel wire. Although not shown in a cut-away view, (for the purpose of clarity), lower torsion spring 226' is attached to vertical frame member 272 and lower gripper jaw shoulder 225'.

Gripper Jaw Operation

Figure 6:
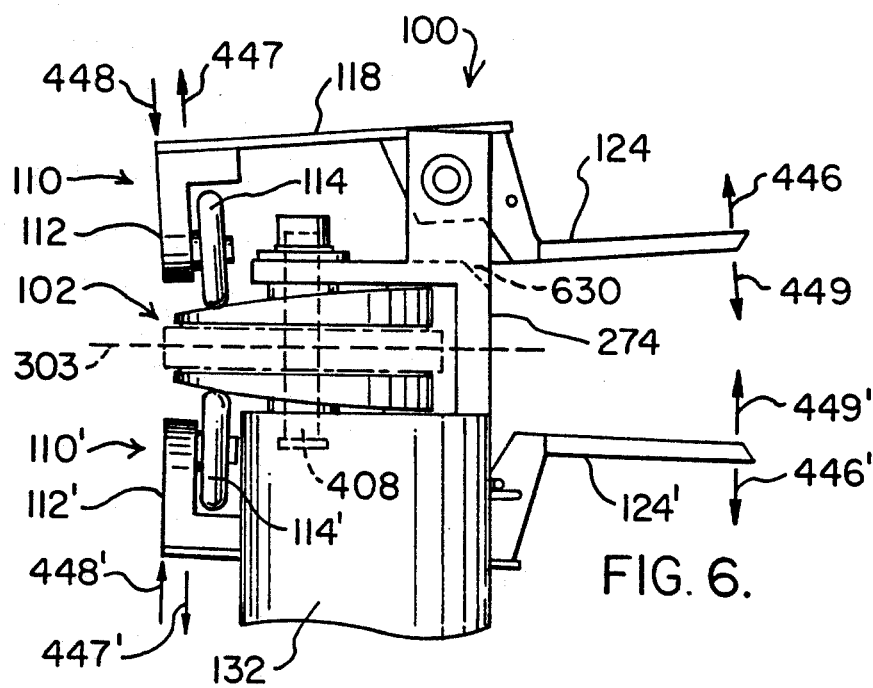
FIG. 6 is a diagrammatic drawing of the gripper apparatus showing the gripper jaws in an open position.
Figure 7:
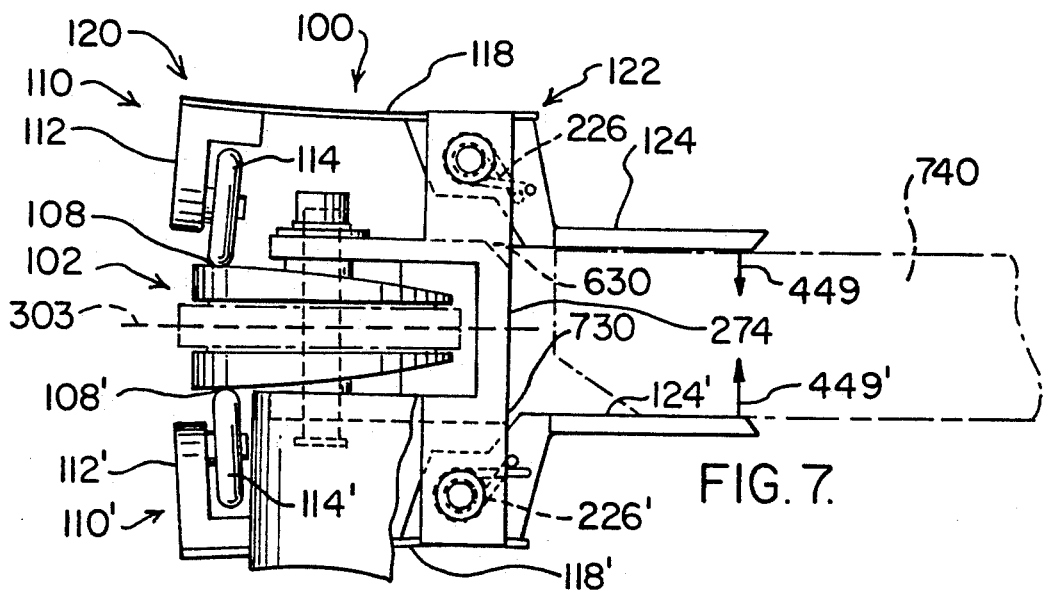
FIG. 7 is a diagrammatic drawing of the gripper apparatus showing the gripper jaws (in a closed position) grasping a media cartridge.

FIG. 6 is a diagrammatic drawing of the gripper apparatus 100 showing the gripper jaws 124,124' in an open position. FIG. 7 is a diagrammatic drawing of the gripper apparatus 100 showing the gripper jaws 124,124' (in a closed position) grasping a media cartridge 740. Typically, the media cartridge 740 is an IBM 3480 form factor cartridge containing magnetic tape, but the media cartridge 740 could contain any other media, such as a magnetic disk or solid state memory.

As shown in FIG. 6, gripper jaws 124,124' are in an open position when cam 102 is rotated such that cam follower bearing/wheels 114,114' are positioned against a low, non-lobed area of cam 102. Each torsion spring 226,226' biases the respective gripper jaw 124,124' toward an open position 446,446'. This torsion spring bias causes the respective cam follower bearing/wheel 114,114' to be urged in direction 448,448' against cam 102.

As shown in FIG. 7, pressure is applied by gripper jaws 124,124' to media cartridge 740 via flat spring 118,118' when cam 102 is rotated such that cam follower bearing/wheels 114,114' are located on a lobe (high area) 108,108' of the cam 102.

Flat spring 118,118' is sufficiently compliant so as to limit the force applied by the gripper jaw 124,124' to the media cartridge 740. The compliant nature of the gripper jaw apparatus 100 also results in a reduction in component stack-up tolerances, thereby reducing manufacturing cost. A predetermined maximum force, determined by the compliance of flat springs 118,118', is therefore applied to the media cartridge 740. In the present embodiment, the maximum force applied to media cartridge 740 is approximately 10 pounds per square inch. Of course, the maximum applied force can be varied to suit a given application by using other combinations of flat springs 118,118' and torsion springs 226,226' wherein springs 118,118', and 226,226' have characteristics which differ from those described herein. Flat spring 118,118' could also be a leaf spring comprised of a plurality of flat spring members 118,118' stacked together.

As shown in FIG. 6, support frame member 274 has a chamfered upper surface 630 which allows upper gripper jaw 124 to pivot to a closed position beyond a horizontal position in direction 449. As shown in FIG. 7, the lower surface 730 of member 274 is not chamfered. Thus, because surface 730 is not chamfered, when lower gripper jaw 124' reaches a horizontal position as it closes, it contacts this lower surface 730 of member 274 which acts as a stop by preventing further pivoting of lower gripper jaw 124' in direction 449'. Therefore, lower gripper jaw 124' will not close (in direction 449') beyond a horizontal position. This positioning limitation of lower gripper jaw 124' insures that the bottom of media cartridge 740 always remains at a fixed height relative to the gripper apparatus 100. This positioning limitation also provides gripper apparatus 100 with a reference edge coincident with the bottom of media cartridge 740. Such a reference edge can be used by the associated robotics system (not shown) to determine the positioning of gripper apparatus 100.

As shown in FIG. 7, in executing a grasping operation, upper gripper jaw 124 continues to pivot in a closed direction 449 slightly past a horizontal position after lower gripper jaw 124' has reached a horizontal position. This beyond-horizontal positioning capability of upper gripper jaw 124 allows the gripper apparatus 100 to grasp a media cartridge 740 or other object, the thickness (height) of which is not exactly equal to that of the spacing of the gripper jaws 124,124' when parallel to each other. The beyond-horizontal positioning capability of upper gripper jaw 124 also reduces the tolerance requirements of the gripper jaw spacing, and in addition, reduces the criticality of vertical positioning of the gripper apparatus 100 with respect to the cartridge 740 to be grasped. The distance between gripper jaws 124,124', when both are in a parallel position, is typically 0.005 inches greater than the height of a media cartridge 740, although this distance could be increased substantially without impairing the functionality of the gripper apparatus 100.

In order to grasp an object, such as a media cartridge 740, gripper jaws 124,124' are first opened by rotating cam 102 to a position where cam follower bearing/wheels 114,114' contact a low (non-lobed) section of the cam 102, as shown in FIG. 6. The gripper apparatus 100 is then positioned (by means not shown) so that the media cartridge 740 or other object to be grasped is located between gripper jaws 124,124'. As shown in FIG. 7, cam 102 is then rotated to a position such that bearing/wheel 114,114' rises onto a cam lobe 108,108'. This urges the front end 120,120' of the flat spring 118,118' outwardly from the cam rotational plane 303. This causes the connected gripper jaw 124,124' to close by pivoting inwardly toward the media cartridge 740 in direction 449, 449' so as to grasp media cartridge 740.

As shown in FIG. 6, when cam 102 is further rotated to a position such that bearing/wheel 114,114' is in contact with a low (non-lobed) area of cam 102, gripper jaw 124,124' opens by pivoting outwardly from media cartridge 740 in direction 446,446' so as to release the media cartridge 740. The outward bias imparted by torsion spring 226,226' to the respective gripper jaw 124,124' facilitates the release of the media cartridge 740 or other object which has been grasped.

Unlike prior art gripper mechanisms, the gripper apparatus 100 of the present invention does not require a reversal of the servo motor direction to release an object being grasped. Servo motor 132 and cam 102 in the present gripper apparatus 100 move in the same direction 152 to grasp and also to release the media cartridge 740 (or other object being grasped). This unidirectional servo motor movement results in less servo motor brush wear and less complicated servo motor logic than a gripper mechanism in which the servo motor direction must be reversed in order to release a grasped object.

Circular Cam

Figure 10:
FIG. 10 is a cross-sectional view of the circular cam taken through section 10—10 of FIG. 8.
Figure 11:
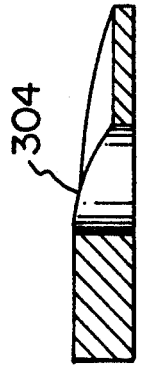
FIG. 11 is a cross-sectional view of the circular cam taken through section 11—11 of FIG. 8.
Figure 12:
FIG. 12 is a cross-sectional view of the circular cam taken through section 12—12 of FIG. 8.

FIGS. 8 through 12 illustrate the circular cam 102 of the present invention. Note that only top cam surface 304 is shown in FIGS. 10 through 12. Top and bottom cam surfaces 304,306 are separated by a timing gear 910 which is driven by toothed drive belt 134. There are several advantages which ensue from the use of a circular cam (such as cam 102), as compared to conventional cams which are attached to "camshafts." The use of a circular cam results in over-all smaller size of the gripper jaw apparatus 100. In addition, a circular cam requires less servo motor power, as a result of the more gradual cam lobe height transition between low and high areas of the cam surface 304,306. Furthermore, servo motor control complexity is reduced because motor stopping areas 801,801', and 804,804' are relatively large and flat. It is to be understood that the cam 102 could have top and/or bottom surfaces which have other than circular shapes. It is important, however, that there be a gradual rotational transition from low to high areas of the cam 102.

Figure 8:
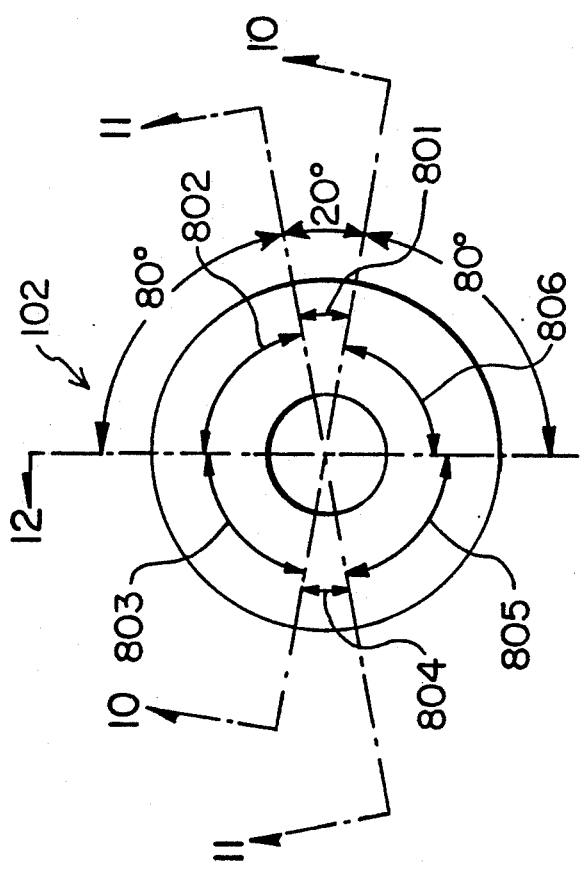
FIG. 8 is a top view of the circular cam used by the gripper apparatus.
Figure 9:
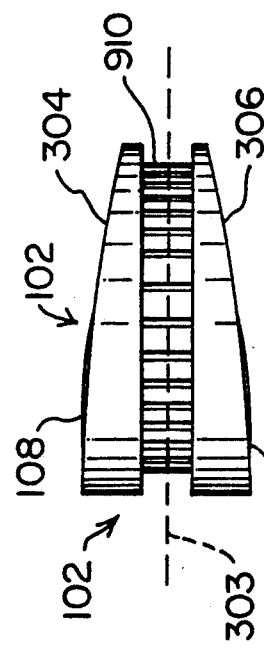
FIG. 9 is a side view of the circular cam used by the gripper apparatus.

FIG. 8 is a top view of the circular cam 102 used by the gripper apparatus 100; FIG. 9 is a side view of the circular cam 102; FIG. 10 is a cross-sectional view of the circular cam 102 taken through section 10—10 of FIG. 8; FIG. 11 is a cross-sectional view of the circular cam 102 taken through section 11—11 of FIG. 8; and FIG. 12 is a cross-sectional view of the circular cam 102 taken through section 12—12 of FIG. 8. Note that only the top part of cam 102 is shown in FIGS. 10–12. Only the top part of cam 102 need be shown, due to the fact that cam 102 is symmetrical about the cam rotational (center) plane 303.

Circular cam 102 is comprised of a hardened steel disk having a gradually inclined slope on both surfaces 304,306 thereof. When the cam 102 is rotated, each cam follower 110,110' is displaced by the corresponding cam surface 304,306, which displacement deflects the flat spring 118,118' to cause the gripper jaws 124,124' to open and close. The two cam surfaces 304,306 located on this disk are separated by timing gear 910 driven by toothed horizontal drive belt 134. Both cam surfaces 304,306 are rigidly affixed to the timing gear 910 so that they rotate in synchronism with one another.

Cam 102 can be viewed as being segmented into six "zones", 801-806, on each cam surface 304,306. As shown in FIGS. 8 and 10, the first zone 801 is a low flat area extending 20° radially. When a cam follower bearing/wheel 114,114' is positioned above this zone 801, gripper jaws 124,124' are displaced to an open position, as shown in FIG. 6.

As shown in FIGS. 8 and 11, the second zone 802 extends 80° radially. The slope in this second zone 802 rises 0.120 inches in 80°. When cam follower bearing/wheel 114, 114' is positioned above the high end of this second zone 802, gripper jaws 124,124' come in contact with media cartridge 740.

As shown in FIGS. 8 and 12, the third zone 803 extends 80° and has a more gradual slope than second zone 802, rising only 0.050 inches in 80°. As cam 102 is rotated so that the cam followers 110,110' transition from the second zone 802 to the third zone 803, gripper jaws 124,124' reach a parallel position, as shown in FIG. 4.

As cam 102 is rotated so that cam follower bearing/wheels 114,114' track across the third zone 803, cam followers 110,110' are displaced further away from cam rotational plane 303. This further displacement of the cam followers 110,110' forces the gripper jaws 124,124' more tightly against the media cartridge 740, as shown in FIG. 7. Flat springs 118,118' bend slightly to prevent excessive pressure from being applied to media cartridge 740. Note that the bending of flat spring 118 is exaggerated in FIG. 7, for the purpose of clarity. The gradual slope of zone 803 reduces the amount of torque required by the gripper drive servo motor to rotate cam 102, thus decreasing the required servo motor size.

As shown in FIG. 8, the fourth zone, 804, like the first zone 801, is high and flat, and extends 20°. This fourth zone 804 is the portion of the cam 102 with which the cam follower bearing/wheel 114,114' will be in contact while the media cartridge 740 is in the grasp of the gripper jaws 124,124'. The fifth zone, 805, extends 80° and has the same slope as the third zone 803, with the slope falling 0.50 inches toward cam rotational plane 303 in 80°. The sixth zone, 806, extends 80° and has the same slope as the second zone 802, falling 0.120 inches in 80°. When cam 102 is rotated so that cam follower 110,110' transitions through zone 6 to zone 1, the connected gripper jaw 124,124' opens, as shown in FIG. 6.

The area between the third zone 803 through the fifth zone 805 can be considered to constitute a cam lobe 108,108'. The identical slopes of each "pair" of zones 801-804, 802-806, and 803-805 allow the cam 102 to be constructed using identical top and bottom surfaces 304,306, since each top/bottom surface 304/306 is effectively a mirror image of the other.

From the foregoing, it can be readily determined that the maximum height of a cam lobe 108,108' exists at a rotational arcuate angle approximately 160 degrees from a minimum height of the cam surface 304,306, both heights being relative to cam rotational plane 303. This 160 degree angle is the sum of the rotational angles of zone 802 and zone 803. However, the rotational arcuate angle over which the cam lobe 108,108' rises to a maximum height relative to the cam surface minimum height is not critical, and the present apparatus would function in essentially the same manner if the cam lobe 108,108' were disposed over a range of rotational angles from a minimum angle of approximately 60 degrees to a maximum angle of approximately 300 degrees.

Figure 13:
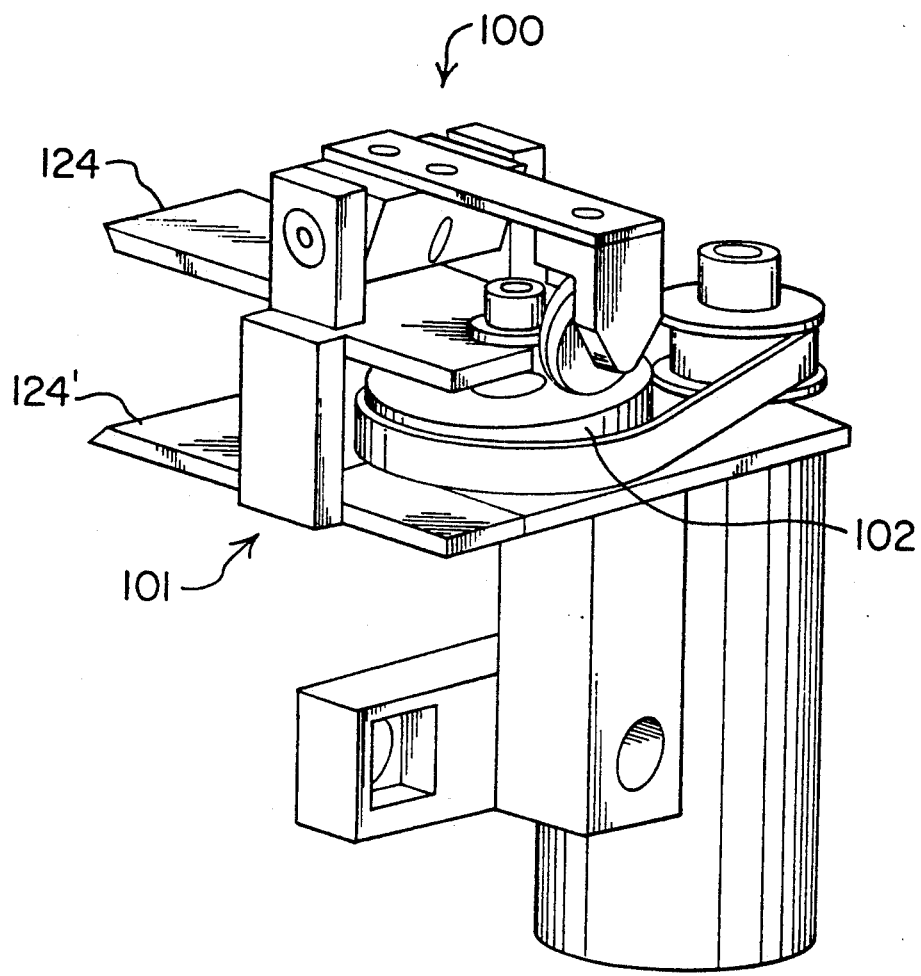
FIG. 13 is a perspective view of an alternative embodiment of the gripping apparatus.

An alternative embodiment of the present gripper apparatus 100 as shown in FIG. 13 includes the apparatus as described above, but wherein only a single gripper jaw 124 is movable. In this embodiment, lower gripper jaw 124' is fixed, for example, in a substantially horizontal position while upper gripper jaw 124 moves (as described above) so as to grip media cartridge 740 against fixed lower jaw 124'. In this embodiment, lower cam follower 110' is eliminated, and the lobed bottom surface 306 of cam 102 is not required. Lower gripper jaw 124' is either rigidly fixed in a horizontal position, or attached to a flat spring, such as 118', as described above. If, in this embodiment, the lower gripper jaw 124' were attached to a flat spring, the flat spring would be rigidly attached to support frame 101 instead of to vertical cam follower arm/bearing/wheel assembly 112',114', which is nonexistent in this embodiment.

The gripper apparatus 100 as described herein could also be used for grasping a variety of objects other than media cartridges, for example, books, video cassette tapes and other objects used in industrial situations, such as boxes or other solid objects.

In summary, the gripper apparatus 100 of the present invention provides for an easily controllable robot gripper jaw apparatus 100 for grasping a media cartridge 740 or other object, wherein the force applied by the gripper jaws 124,124' does not damage the object being grasped. In addition, the gripper apparatus 100 employs a novel circular cam 102 which reduces the amount of torque required to operate the gripper jaws 124,124', thereby allowing use of a smaller servo motor 132. The use of a circular cam 102 thus additionally decreases the overall size and complexity of the gripper apparatus 100.

It is to be expressly understood that the claimed invention is not to be limited to the description of the preferred embodiment but encompasses other modifications and alterations within the scope and spirit of the inventive concept.

We claim:

1. Apparatus including a pair of gripper jaws for grasping an object, said apparatus comprising:
    (a) a cam having a top surface and also having a center plane having both axes perpendicular to an axis of rotation of said cam, wherein said top surface has a lobed area and a non-lobed area and intersects said axis of rotation;
    (b) a cam follower abutting said top surface of said cam;
    (c) a flexible member for connecting one jaw of said pair of gripper jaws to said cam follower, said flexible member being effective for applying a predetermined maximum closing force via said one jaw against said object in response to a predetermined displacement of said cam follower relative to said center plane of said cam;
    (d) means for biasing said one jaw away from said center plane toward an open position to urge said cam follower against said top surface of said cam;

(e) means for closing said one jaw to grasp said object by rotating said cam to a first position in which said cam follower abuts said lobed area of said cam; and (f) means for opening said one jaw to release said object by rotating said cam to a second position in which said cam follower abuts said non-lobed area of said cam.

2. The apparatus of claim 1, wherein said cam is rotated about said axis of rotation in only one direction to effect both the grasping and releasing of said object.

3. Apparatus for grasping an object, said apparatus comprising:
   (a) a cam having a top surface and a center plane positioned at a right angle to an axis of rotation of said cam, said top surface having a lobed area and a non-lobed area;
   (b) first cam follower means abutting said top surface of said cam;
   (c) gripper means capable of assuming a closed position and an open position for respectively grasping and releasing said object;
   (d) a first flexible member connecting said first cam follower means to said gripper means;
   (e) first biasing means for biasing:
      (i) said gripper means toward said open position, and
      (ii) said first flexible member to urge said first cam follower means against said top surface of said cam;
   (f) means for closing said gripper means to grasp said object when said cam is rotated to a position in which said cam follower means abuts said lobed area of said cam; and
   (g) means for opening said gripper means to release said object when said cam is rotated to a position in which said cam follower means abuts said non-lobed area of said cam.

4. The apparatus of claim 3, wherein said gripper means includes an upper gripper jaw and a lower gripper jaw for grasping said object therebetween, said lower gripper jaw being fixed in a substantially horizontal position.

5. The apparatus of claim 4, wherein said first biasing means includes a coil spring for applying a torsional force to said upper gripper jaw.

6. The apparatus of claim 3, wherein said cam is rotated only in one direction to effect both the grasping and releasing of said object.

7. The apparatus of claim 3, wherein said cam also has a bottom surface with a lobed area and a non-lobed area located thereon, and wherein said gripper means includes an upper gripper jaw and a lower gripper jaw for grasping said object therebetween, said apparatus further including:
   (a) second cam follower means abutting said bottom surface of said cam;
   (b) a second flexible member connecting said second cam follower means to said lower gripper jaw;
   (c) second biasing means for biasing:
      (i) said lower gripper jaw toward said open position, and
      (ii) said second flexible member to urge said second cam follower means against said bottom surface of said cam;
   (d) means for closing said gripper means to grasp said object when said cam is rotated to a position in which said second cam follower means abuts said lobed area of said cam; and
   (e) means for opening said gripper means to release said object when said cam is rotated to a position in which said cam follower means abuts said non-lobed area of said cam.

8. The apparatus of claim 7, wherein said first biasing means and said second biasing means each includes an attached coil spring, each said coil spring being effective for applying a torsional force to a connected said gripper jaw.

9. Apparatus for grasping an object, said apparatus comprising:
   (a) a circular cam rotatably mounted on a support frame, said circular cam having a center plane positioned at a right angle to an axis of rotation of said cam;
   (b) a top surface on said circular cam;
   (c) a lobed area and a non-lobed area on said circular cam;
   (d) grasping means attached to said support frame including a first gripper jaw and a second gripper jaw,
   (e) means for pivotally engaging said first gripper jaw to said support frame about an axis oriented parallel to said center plane;
   (f) said first and second gripper jaws being oppositely disposed from each other so as to grasp a said object located therebetween when said first gripper jaw pivots toward said second gripper jaw;
   (g) upper cam follower means including an arm slidably abutting said top surface of said circular cam;
   (h) an upper flexible member connecting said arm and said first gripper jaw;
   (i) means for biasing said first gripper jaw toward an open position away from said center plane to urge said arm against said top surface of said circular cam;
   (j) means for closing said first gripper jaw wherein said circular cam is rotated to a position in which said arm engages said lobed area to cause said first gripper jaw to grasp said object; and
   (k) means for opening said first gripper jaw wherein said circular cam is rotated to a position in which said arm engages said non-lobed area to cause said first gripper jaw to release said object.

10. The apparatus of claim 9, wherein said lobed area has a gradual slope such that a maximum height of said lobed area is situated at a rotational angle substantially greater than 30 degrees from a minimum height of said non-lobed area, said maximum and said minimum heights being relative to said center plane.

11. The apparatus of claim 9, wherein said circular cam also has a lobed bottom surface with a lobed area and a non-lobed area, said apparatus further including:
   (a) lower cam follower means abutting said bottom surface of said circular cam;
   (b) means for biasing said second gripper jaw toward an open position away from said center plane at a right angle thereto;
   (c) a lower flexible member connecting said lower cam follower means to said second gripper jaw, said lower flexible member being biased by said second gripper jaw biasing means to urge said lower cam follower means against said bottom surface of said circular cam;
   (d) means for closing said second gripper jaw by rotating said circular cam to a position in which said lower cam follower means engages said lobed area on said bottom surface of said circular cam; and (e) means for opening said second gripper jaw by rotating said cam to a position in which said lower cam follower means engages said non-lobed area of said bottom surface of said circular cam.

12. The apparatus of claim 11, wherein said means for biasing said first gripper jaw and said means for biasing said second gripper jaw each include a coil spring, each said coil spring applying a torsional force to a respective said gripper jaw.

13. The apparatus of claim 9, wherein said upper flexible member is a flat spring which applies a predetermined maximum closing force via said first gripper jaw against said object in response to a predetermined displacement of said upper cam follower means with respect to said center plane of said cam at a right angle thereto, wherein said predetermined maximum closing force is not substantially exceeded when said predetermined displacement of said upper cam follower means is exceeded.

14. The apparatus of claim 9, wherein said arm has a first end and a second end, said first end of said arm being connected to said first end of said upper flexible member, said second end of said arm being rotatably disposed on said top surface of said cam via slidable means rotatably connected to said second end of said arm.

15. The apparatus of claim 9, wherein said cam is rotated only in one direction to effect both the grasping and releasing of said object.

16. In a robotics system, apparatus for grasping a media cartridge, said apparatus comprising:

(a) a support frame;

(b) a circular cam rotatably mounted on said support frame, said circular cam having a top surface and a bottom surface and a center plane bisecting said circular cam at a right angle to an axis of rotation thereto;

(c) a first lobed area and a first non-lobed area on said top surface of said circular cam;

(d) a second lobed area and a second non-lobed area on said bottom surface of said circular cam;

(e) grasping means including a first gripper jaw and a second gripper jaw capable of assuming a closed position and an open position for respectively grasping and releasing said media cartridge;

(f) means for pivotally engaging said first gripper jaw and said second gripper jaw to said support frame;

(g) first means for biasing said first gripper jaw toward an open position away from said center plane toward an open position;

(h) second means for biasing said second gripper jaw toward an open position away from said center plane toward an open position; and (i) a first cam follower and a second cam follower, said first cam follower abutting said top surface of said circular cam, and said second cam follower abutting said bottom surface of said circular cam, each of said first and said second cam followers comprising:

(1) slidable means slidably abutting a said surface of said cam, said slidable means being urged against a said surface of said circular cam by one of said biasing means;

(2) a flexible member connected between one of said gripper jaws and one of said slidable means, said flexible member being effective for applying a predetermined maximum closing force against said media cartridge in response to a maximum displacement of said cam follower from said center plane of said circular cam;

(j) means for moving each of said gripper jaws toward a closed position to grasp said media cartridge between said gripper jaws when said circular cam is rotated to a position in which said first and said second cam followers engage said first and said lobed areas, respectively, to cause said first and said second gripper jaws to grasp said media cartridge therebetween; and (k) means for moving each of said gripper jaws toward an open position to release said media cartridge when said circular cam is rotated to a position in which said first and said second cam followers engage said first and said second non-lobed areas, respectively, to cause said first and said second gripper jaws to release said media cartridge.

17. The apparatus of claim 16, wherein said lobed area has a gradual slope such that a maximum height of said lobed area is situated at a rotational angle at least 30 degrees from a minimum height of said non-lobed area, said maximum and said minimum heights being relative to said center plane.

18. The apparatus of claim 16, wherein said slidable means is attached to said flexible member via an arm.

19. The apparatus of claim 16, wherein each of said first and said second biasing means is a coil spring being effective for applying a torsional force to one of said gripper jaws.

20. The apparatus of claim 16, wherein said flexible horizontal member is a flat spring.

21. The apparatus of claim 16, wherein said circular cam is rotated in only one direction to effect both the grasping and releasing of said media cartridge.

22. The apparatus of claim 16, wherein each of said first and said second lobes has a gradual slope such that a maximum height, relative to said center plane, of each of said first and said second lobes exists at a rotational arcuate angle at least 30 degrees from a minimum height of a said surface of said circular cam.

* * * * *